Feb. 10, 1953     W. H. BENDALL     2,627,756

POWER TRANSMISSION CHAIN

Filed July 24, 1947

INVENTOR.

Wilfrid H Bendall

Patented Feb. 10, 1953

2,627,756

UNITED STATES PATENT OFFICE 2,627,756

POWER TRANSMISSION CHAIN

Wilfrid H. Bendall, New York, N. Y.

Application July 24, 1947, Serial No. 763,323

20 Claims. (Cl. 74—229)

This invention relates to improvements in mechanical power transmission chains and their drive wheels. Chains commonly in use for this purpose employ functionally rigid, pin-jointed links which pivot when engaging the drive sprockets.

Pin bearing capacity and link impact are the principal design factors limiting the potential horsepower transmitting capacity of these chains. This will be apparent when it is considered that, with rigid links, the working pitch line of the chain on its drive sprocket is essentially polygonal rather than circular. This causes the effective drive radius to change in value with the engagement and disengagement of each link, as the line of drive strand tangency subtends the sprocket pitch circle. The links pivot into position on the sprocket at a considerably increased relative velocity and the acceleration imparted to each pitch length of the chain by this action results in a succession of impacts. Since this impact condition is proportional to the square of the sprocket revolutions and to the mass of the links it rapidly assumes destructive proportions at higher chain speeds.

It is customary to lessen these deleterious effects by limiting the chain load and the specific sprocket speed, using smaller link pitch sizes and relatively large sprocket tooth numbers, and using positive, encased lubrication-expedients which necessarily increase the cost and complexity of the drive. These inherent operating characteristics additionally render rigid pivoted link chains essentially uneconomical in the light of modern drive requirements. For use at low linear speeds, where negligible dynamic effects make chain structural refinements superfluous, such chains tend to be too expensive, while at increased speeds, where the destructive operational dynamics are rapidly cumulative, the foregoing working characteristics again prevent effective utilization of the high intrinsic chain strength and refined manufacture. A further economic disadvantage is that the allowable chain speeds vary inversely with the pitch dimension so that different pitch sizes are required at different operating speeds. The range of efficient and economical use of a given size of chain is thus drastically narrowed and it is necessary to manufacture a large number of standard sizes, as many as twelve or more, to provide an adequate range of transmission capacities.

The desirability of improving upon the pivoted link chain construction principle will be obvious from the above discussion, and a power transmission chain which would combine the smooth-running characteristics and spatial flexibility of belting with the positive drive ratio feature of chains has been a tacit requirement for many years. This will be understood by considering that if the links were made flexible, and were correctly supported on the drive sprocket, the chain action would closely approximate the smooth shockless wrapping action of a belt about a pulley, and the impact and pivot bearing load limitation would also be avoided.

It is recognized that the prior art discloses a number of attempts to devise a practical non-pivoting chain construction which would accomplish this. Many of these, of which U. S. Patent No. 538,895 of May 7, 1895, to L. A. Casgrain for a Power-Transmitting Band may be taken as an example, were patented more than fifty years ago. The continued failure to employ the flexible non-pivoting link principle, however, indicates that prior proposals of this nature have not shown enough technical or economic superiority to the pivoted link design to merit development and use for general power transmission purposes.

It is, therefore, among the primary objects of this invention to provide an efficient non-pivoting link chain for general power transmission purposes, of simpler design and lower manufacturing cost, which would avoid the foregoing dynamic difficulties and provide greater horsepower transmitting capacity for a given unit cost, bulk and weight than hitherto accomplished.

Additional objects of this invention are to provide a power transmission chain that will transmit power at uniformly high efficiency and at substantially constant angular velocity over a linear speed range extending to at least ten thousand feet per minute.

Other objects are to provide a power transmission chain that is conveniently adaptable, through minor structural modifications, for driving with reversed flexure, for driving through frictional engagement and for driving with simultaneous positive and frictional engagement.

Another object is to provide a power transmission chain design in which all sizes of chain constructed according to the principles set forth herein will operate with equal efficiency and smoothness, over an identically wide range of speeds, so that manufacture in only three or four pitch sizes provides a fully adequate range of horsepower capacities for general commercial requirements.

Another object is to provide a non-pivoting link power transmission chain structure than can be conveniently joined or separated at any desired link position without special tools.

Another object is to provide a power transmission chain that is substantially frictionless in operation and therefore independent of lubrication for efficient performance.

Further objects and advantages of this invention will be apparent from the following description when read with reference to the accompanying drawings which detail several embodiments thereof, the novel features of which will be defined in the appended claims.

Referring to the drawings.

Figures 1, 2:
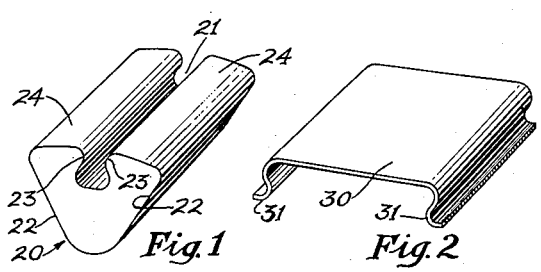
Fig. 1 is a perspective view of a block link member of the chain embodying this invention.
Fig. 2 is a perspective view of a flexible link member.
Figure 3:
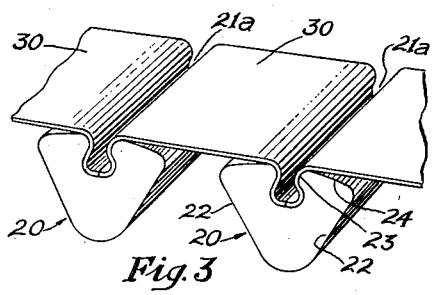
Fig. 3 is a perspective view of a partial length of an assembled chain using the parts shown in Figs. 1 and 2.

Figs. 1 and 2 show typical parts of a chain embodying this invention comprising respectively, a block link member 20, constructed of relatively rigid material, and a flexible link member 30, of resilient sheet material. The block link member is provided with a groove 21 while the flexible link member is provided with crimped portions 31 extending across the link member and forming attachment lugs 31, for engaging the groove of the block member. As shown in Fig. 3 the flexible links are assembled end to end, with abutting crimped portions forming a symmetrical attaching lug 21a, corresponding in sectional outline to the groove in the block members. The spacing of these attaching lugs determines the spacing of the block link members and, therefore, the pitch of the chain. With suitably chosen groove proportions, preferably of wedge form, as shown, and attaching lugs shaped to fit closely therein, the chain structure assembled in this manner is substantially self-locking under any longitudinal pulling force within the designed capacity of the parts. This self-locking feature is obtained with a comparatively light transverse fit of the attaching lugs in the grooves, and the links of a slack chain can consequently be readily separated or replaced at any point by sliding a link or block member out of this self-locking attachment to adjacent members.

Figure 4:
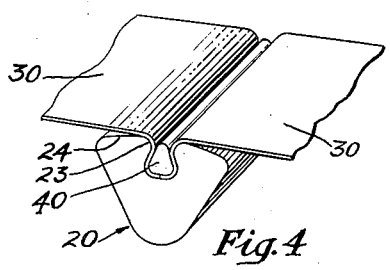
Fig. 4 is a perspective view of a modified method of securing the joints of the chain illustrated in Fig. 3.
Figure 5:
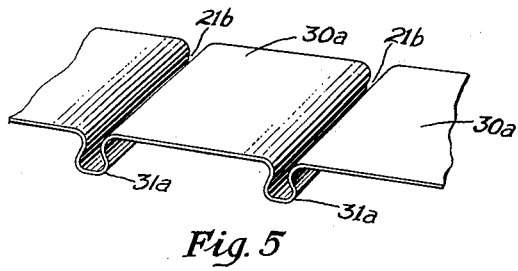
Fig. 5 is a perspective view of a modification comprising a continuous strip link member of the type shown in Fig. 2.

While the construction described above gives adequate chain capacity for ordinary uses, if the transmitted load is relatively heavy and it is desired to provide greater capacity, the simple structural modification illustrated in Fig. 4 provides this by means of a locking pin 40, shaped to fit clearance groove 21a in Fig. 3, between the crimped ends of the abutting flexible link members. The pin can be a light push or drive fit in the groove and permits development of the maximum load capacity of the chain parts while still retaining the advantage of convenient disassembly noted above.

Where the advantage of link separation and replacement at any part of the chain is not required the flexible link member may alternatively be formed in a continuous strip as shown in Fig. 5 where 30a designates such a member and 31a the crimped portions, uniformly spaced in accordance with the designed working pitch of the chain. As before, the crimped portions are shaped to provide wedge-form attaching lugs for self-locking engagement with the grooves of the block link members 20. This modification permits desirable manufacturing and merchandising economies since a drive chain of any desired pitch length can be quickly and conveniently fabricated by cutting the required continuous length flexible link member and sliding the block links transversely thereon. It will be observed that the advantage of the wedge locking pin shown in Fig. 4 can be applied to this modification also.

Although the block link members 20, are shown with a substantially triangular axial section it will be apparent that their engagement faces 22, 22 may have any desirable curvature and relative angle, as determined by considerations of required section depth, tooth contact and chain load distribution on the sprocket. The wedging groove 21, of the block members, is provided with rounded entrance shoulders 23, 23 tangent to both the groove walls and to the link-supporting surfaces 24, 24 of relatively larger radius at each side of the groove. The latter radius is made approximately equal to the flexible link curvature on the smallest allowable drive sprocket diameter engaged by the chain, where the maximum link support is required and, with the groove entrance radii, serves both as a supporting shoulder for the link flexure and to exactly delimit the bending stress at these points.

Figure 6:
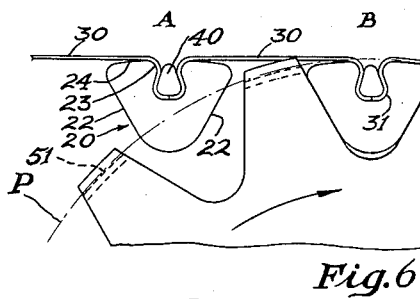
Fig. 6 illustrates in partial side elevation a chain with joints of the type shown in Fig. 4, engaging a drive sprocket.

Fig. 6 shows a chain, with wedge pin locked joints of the type shown in Fig. 4, under load and engaging a drive sprocket 50 rotating in the direction indicated by the arrow. The sprocket tooth tips are utilized to provide cylindrical link supporting areas 51, with a diameter equal to that of the drive pitch circle P, less the thickness of the flexible link material. Three progressive stages of chain engagement are designated A, B and C. At A a block link member is entering a sprocket tooth gap and the leading end of the flexible link between A and B is at the point of drive strand tangency with the sprocket pitch circle, coinciding with the line of link flexure. The block link member at B is already fully seated on the sprocket and it will be seen that the sprocket tooth gap proportions fit those of the block member, providing substantially continuous chain support and maintaining chain engagement at a constant drive pitch circle. The flexible link between B and C is completely engaged by the sprocket and, as shown, is supported by the block members at those positions and at its midpoint by bearing on the sprocket tooth. The flexible links are preferably constructed of strong, resilient material, such as spring steel, and the normal elastic curvature of the links in bridging the short gap between the block shoulder and the sprocket tooth bearing closely approximates a curve of constant radius. The resilient properties of such links are similarly utilized to maintain uniform flexural action where the wedge joint momentarily interrupts the flexural continuity of the chain structure. Support of the chain in this manner is an important factor in ensuring a smooth, efficient drive. The use of flexible links renders the chain action substantially frictionless since no appreciable rubbing contact is involved and sprocket engagement takes place at practically zero relative velocity and thus, with negligible impact.

Figure 7:
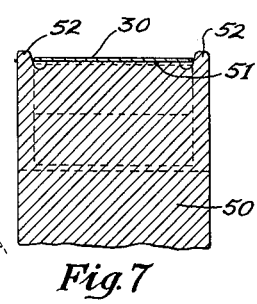
Fig. 7 is a sectional view on the line 7—7 of Fig. 6 showing the method of retaining the chain on the sprocket.

Fig. 7 shows the method of retaining the chain against lateral displacement on the sprocket. Radially projecting ridges 52, at axially opposite ends of the sprocket teeth, provide a shallow guide channel and a lateral retaining surface at the edges of the flexible links. This arrangement ensures the necessary light, positive restraint against any tendency of the chain to drift sideways on the sprocket face.

It will be appreciated that the chain and drive sprocket described in the foregoing can be fabricated in any convenient unit drive width or, alternatively, a given drive may comprise a number of relatively narrow unit chain widths arranged in close proximity across the face of a single sprocket.

Figure 8:
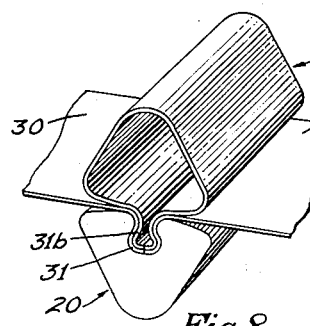
Fig. 8 is a perspective view of a part of the chain shown in Fig. 3 with the addition of a modified block link member permitting drive sprocket engagement with both faces of the chain.
Figure 9:
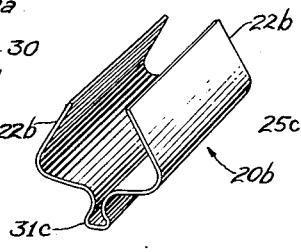
Fig. 9 is a perspective view of a modified block link member which can be substituted for or used interchangeably with the one shown in Fig. 8.

It is occasionally desirable to provide for reverse rotation of one or more sprockets in a given chain drive by enabling simultaneous sprocket engagement with the opposite side of the chain. Two convenient and economical methods of adapting the present chain for this purpose are shown in Figs. 8 and 9. Fig. 8 shows a modified block link member 20a, constructed of any suitable sheet material and formed with the same external contour as block members 20. Crimped end portions 31b provide a projecting key for wedged insertion between the ends of the flexible links 30 in the groove of the tooth block. As shown, this modified member is assembled in the chain directly over the solid block member to provide a symmetrically opposed sprocket engaging tooth for driving with reversed chain flexure. Since no load is imposed on this member until it engages a sprocket it advantageously employs the relatively resilient and light construction shown. The crimped portions, incidentally, serve in place of the wedging pin in Figs. 4 and 6, to secure the assembly, although a similar pin of smaller cross-section may evidently be added if desired.

Fig. 9 illustrates an alternative method of making these supplementary block link members for reversed flexure engagement. This member, designated 20b, is similarly constructed from sheet material, but in this case is transversely crimped at its center to provide the attaching wedge means 31c, while the remainder of the material is formed into an open channel section with sprocket tooth engagement faces 22b at the desired included angle. It will be seen that this member has the same general contour as the block members 20 in order to provide similar supporting shoulder radii for the flexible links, and can also be utilized to lock the chain assembly in the manner described for the construction shown in Fig. 8.

Figure 10:
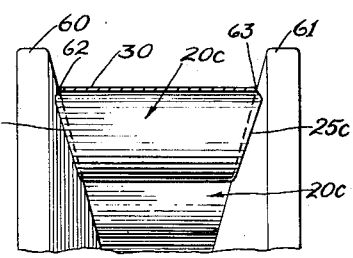
Fig. 10 is a partial transverse end elevation taken through a drive strand of the chain, of a further modification, showing the chain of Fig. 6 provided with block link members having inclined end engagement faces in wedged frictional engagement with conical drive wheel faces.
Figure 11:
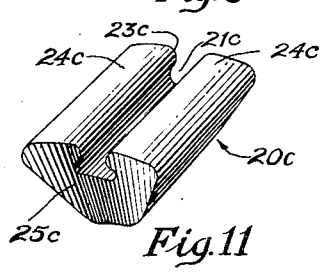
Fig. 11 illustrates, in perspective, one of the modified block link members of the chain shown in Fig. 10.

A power transmission requirement of great economic importance, which has not hitherto been met by ordinary drive chains, is that of the infinitely variable speed transmission using adjustable conical discs for varying transmitted speed and torque. Effective use of a drive chain for this purpose would make it possible to handle much greater horsepower in a given bulk than is possible with the belts ordinarily used. This requirement can be conveniently and efficiently met by a simple modification of the block link members of the present chain construction. This modification of the block members of the chain of Fig. 6 is shown in Fig. 10 where 20c designates block members otherwise identical with the block members 20, illustrated in Figs. 1, 3, 4, 6 and 8, modified by being provided with oppositely inclined end engagement faces 25c. These are shown in wedged frictional driving engagement with a pair of axially adjustable conical discs 60, 61. The oppositely inclined end faces of these modified blocks may be flat, or may be conical to coincide with the maximum designed conical disc drive radius required to be engaged by the blocks. The perspective view in Fig. 11 separately illustrates such a block 20c with oppositely inclined internally conical end faces 25c, and with the wedge groove 21c and flexible link supporting shoulder radii 24c previously described. Supplementary circumferential support of the chain links at a substantially constant drive radius when engaging the conical disc surfaces, is provided as shown in Fig. 10, by the flexible link edge bearing on the conical disc surfaces at 62 and 63 on each side of the chain, between the points of block engagement. Increasing or decreasing the axial spacing of the discs 60 and 61 causes the chain to engage a smaller or larger drive diameter in infinitely variable increments, as desired. The sectional shape of the block link members makes them well adapted to withstand the necessary axial pressures for transmitting the full load capacity of the chain in this type of transmission. The chain with the ends of the block link members modified in this way can also be used with fixed drive diameter V-pulleys and it will be noted that this modification does not interfere with normal and simultaneous use of the chain for any desired combination of positive and frictional drive engagement in which the unmodified portions of the block link members engage a toothed drive sprocket, as already described and separately illustrated in Fig. 6.

It will be understood that the specific structural forms of the power transmission chain shown and described herein are to be taken as preferred examples of the same and that modifications other than those mentioned may evidently be made without departing from the spirit and scope of this invention. For example, while the link members have been described as secured to the block members by a self-locking, wedged joint it will be evident that other means, such as welding or cementing, may additionally be employed to secure the joint. The flexible link members may be made wider than the block members and provided with projecting retaining ears engaging the ends of the blocks, to prevent lateral displacement of these members relative to each other. Alternatively, the ends of the pin members or the edges of the blocks at the groove may be upset to provide such restraint. The form of the wedge joint, and construction of the flexible link and block link members may vary considerably in detail. The block members may, for example, be built up of stampings, forming a laminated block, and may be assembled alternately above and below the line of the flexible links. These variations are suggested to show that such changes in the construction, proportions and arrangement of the parts of this transmission chain are entirely within the province of this invention and that the specific forms illustrated and described convey no limitations not imposed by the appended claims.

I claim:

1. Power transmission apparatus comprising a drive wheel with opposed conical engagement faces and a chain comprising transverse sprocket engaging members having conical end engagement faces for wedged frictional engagement with said drive wheel, said sprocket engaging members being in wedged attachment to flexible sheet link members with side edges in supporting contact with said engagement faces.

2. A power transmission chain comprising flexible sheet link members crimped to provide attaching lugs extending transversely thereof and drive engagement block members grooved for attachment to said lugs and shaped to provide link supporting surfaces on each side of said groove.

3. A power transmission chain as in claim 2, and a locking pin inserted in said groove.

4. A power transmission chain comprising flexible sheet material crimped at spaced intervals to provide attaching lugs extending transversely thereof and drive engagement block members grooved for attachment to said lugs and shaped to provide sheet supporting surfaces on each side of said groove.

5. A power transmission chain as in claim 4, and a locking pin inserted in said groove.

6. A power transmission chain comprising flexible sheet link members crimped to provide wedge-form attaching lugs extending transversely thereof and drive engagement block members provided with a wedge-form groove to enable attachment to said lugs and shaped to provide link supporting surfaces on each side of said groove.

7. A power transmission chain as in claim 6, and a locking pin inserted in said groove.

8. A power transmission chain comprising flexible sheet material crimped to provide wedge-form attaching lugs extending transversely thereof and drive engagement block members provided with a wedge-form groove to enable attachment to said lugs and sheet supporting surfaces on each side of said groove.

9. A power transmission chain as in claim 8, and a locking pin inserted in said groove.

10. A power transmission chain comprising flexible sheet material provided with attaching lugs extending transversely thereof and drive engagement block members grooved to enable attachment to said lugs and shaped to provide sheet supporting surfaces on each side of said groove and side and end drive engagement surfaces.

11. A power transmission chain comprising flexible sheet material provided with attaching lugs extending transversely thereof and drive engagement block members grooved to enable attachment to said lugs and shaped to provide sheet supporting surfaces on each side of said groove and conical end engagement faces.

12. Power transmission apparatus comprising a drive wheel with conical engagement faces and a chain comprising flexible sheet material provided with attaching lugs extending transversely thereof and drive engagement block members grooved to enable atttachment to said lugs and shaped to provide sheet supporting surfaces on each side of said groove and conical engagement faces for wedged frictional engagement with said drive wheel faces.

13. Power transmission apparatus comprising a chain engaging a toothed drive sprocket, said chain having a flexible sheet link member provided with spaced attaching lugs extending transversely thereof and sprocket engagement block members in grooved attachment to said lugs, said drive sprocket having tooth peripheries providing transverse supporting areas for said link member between said block members.

14. The power transmission apparatus of claim 13 further comprising a drive pulley with opposed conical engagement faces and said sprocket engagement block members further provided with oppositely inclined end engagement faces, said end engagement faces being in wedged frictional engagement with said conical engagement faces.

15. A power transmission chain comprising a flexible sheet member joined to drive engagement members constructed of relatively rigid sheet material and relatively rigid block material and means for attaching said members to each other comprising attaching lugs formed in said flexible and rigid sheet members and an attaching groove formed in the block members, said lugs and said groove being shaped for interlocking assembly with each other.

16. The power transmission chain of claim 2 and supplementary drive members comprising sheet material formed into a closed tubular section with abutting end portions shaped to provide an attaching lug for co-insertion in the groove of said block members.

17. The power transmission chain of claim 2 and supplementary drive members comprising sheet material formed into a channel section with a base crimped to provide an attaching lug for co-insertion in the groove of said block members.

18. A power transmission chain comprising a flexible sheet link member provided with attaching lug portions and detachable drive engagement block members provided with a groove shaped to enable said block members to slidably engage and lock with said lug portions.

19. A power transmission chain comprising a flexible sheet link member provided with attaching lug portions and detachable drive engagement block members provided with side and end engagement faces and a groove shaped to enable said block members to slidably engage and lock with said lug portions.

20. A power transmission chain comprising flexible sheet link members provided with wedge-form attaching lugs and detachable block members provided with a wedge-form groove for engaging said lugs whereby the members thus engaged become self-locking under a working load.

WILFRID H. BENDALL.

REFERENCES CITED

The following references are of record in the file of this patent:

UNITED STATES PATENTS

| Number | Name | Date |
|---|---|---|
| 515,004 | Loomis | Feb. 20, 1894 |
| 618,083 | Gentry | Jan. 24, 1899 |

FOREIGN PATENTS

| Number | Country | Date |
|---|---|---|
| 143,540 | Great Britain | 1920 |